United States Patent [19]

Usnick et al.

[11] 4,174,728
[45] Nov. 20, 1979

[54] SLIDING-GATE VALVE

[75] Inventors: George B. Usnick, Birmingham; Gene T. Ward; Henry O. Blair, both of Sylacauga, all of Ala.; James W. Roberts, Charlotte, N.C.; Terry N. Warner, Wilsonville, Ala.

[73] Assignee: The United States of America as represented by the United States Department of Energy, Washington, D.C.

[21] Appl. No.: 851,330

[22] Filed: Nov. 14, 1977

[51] Int. Cl.² .............................................. F16K 3/20
[52] U.S. Cl. .................................. 137/240; 251/170; 251/328
[58] Field of Search ............... 137/238, 240; 251/157, 251/170, 327, 328, 326, 158, 159

[56] References Cited

U.S. PATENT DOCUMENTS

| 423,755 | 3/1890 | Giles | 251/328 |
| 2,664,338 | 12/1953 | Cornell | 137/240 X |
| 3,038,693 | 6/1962 | Dumm | 251/171 |
| 3,171,429 | 3/1965 | Sturmer et al. | 251/170 X |
| 3,204,924 | 9/1965 | Bredtschneider | 251/328 X |
| 3,214,131 | 10/1965 | Boldt et al. | 251/170 |
| 3,570,510 | 3/1971 | Tsutsumi | 137/240 X |
| 3,834,664 | 9/1974 | Atkinson | 251/328 X |
| 3,918,471 | 11/1975 | Bedner | 251/326 X |
| 4,124,194 | 11/1978 | Alvarez et al. | 251/159 |

Primary Examiner—Martin P. Schwadron
Assistant Examiner—Richard Gerard

Attorney, Agent, or Firm—Dean E. Carlson; Stephen D. Hamel; Fred O. Lewis

[57] ABSTRACT

This invention is a novel valve of the slidable-gate type. The valve is designed especially for long-term use with highly abrasive slurries. The sealing surfaces of the gate are shielded by the valve seats when the valve is fully open or closed, and the gate-to-seat clearance is swept with an inflowing purge gas while the gate is in transit.

A preferred form of the valve includes an annular valve body containing an annular seat assembly defining a flow channel. The seat assembly comprises a first seat ring which is slidably and sealably mounted in the body, and a second seat ring which is tightly fitted in the body. These rings cooperatively define an annular gap which, together with passages in the valve body, forms a guideway extending normal to the channel. A plate-type gate is mounted for reciprocation in the guideway between positions where a portion of the plate closes the channel and where a circular aperture in the gate is in register with the channel.

The valve casing includes opposed chambers which extend outwardly from the body along the axis of the guideway to accommodate the end portions of the gate. The chambers are sealed from atmosphere; when the gate is in transit, purge gas is admitted to the chambers and flows inwardly through the gate-to-seat-ring, clearance, minimizing buildup of process solids therein. A shaft reciprocated by an external actuator extends into one of the sealed chambers through a shaft seal and is coupled to an end of the gate. Means are provided for adjusting the clearance between the first seat ring and the gate while the valve is in service.

6 Claims, 6 Drawing Figures

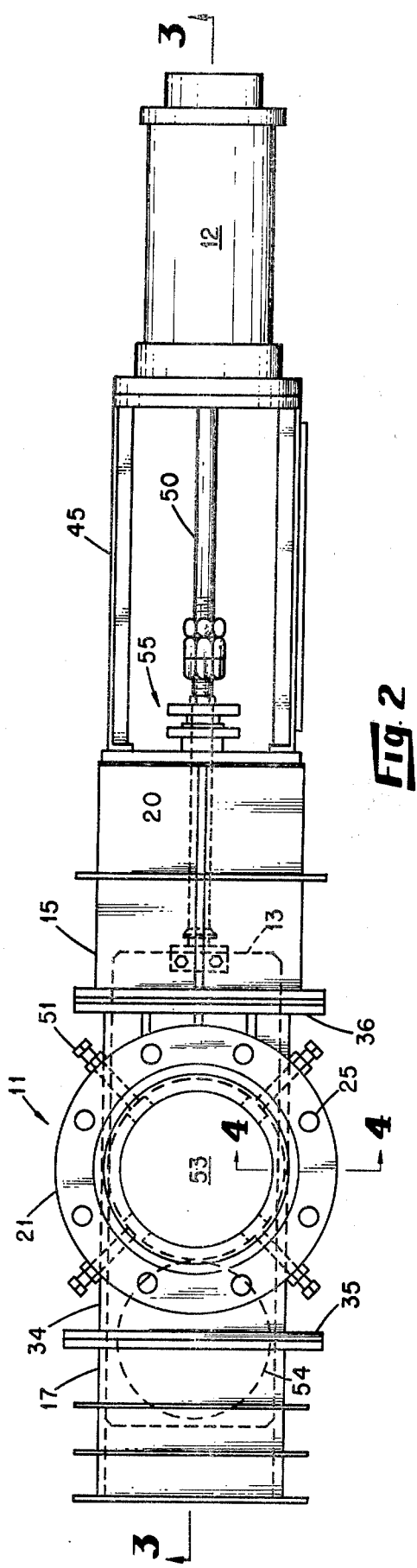
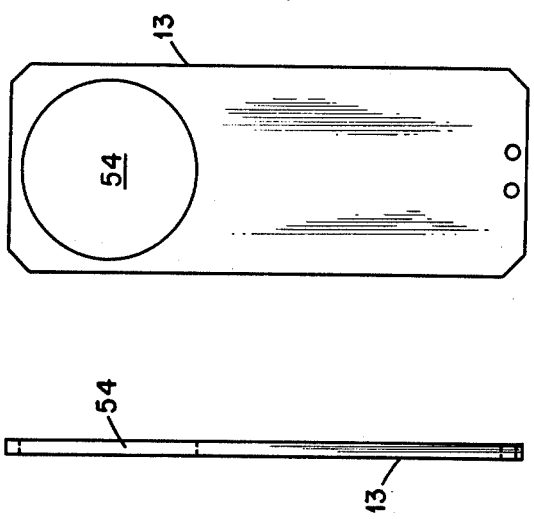

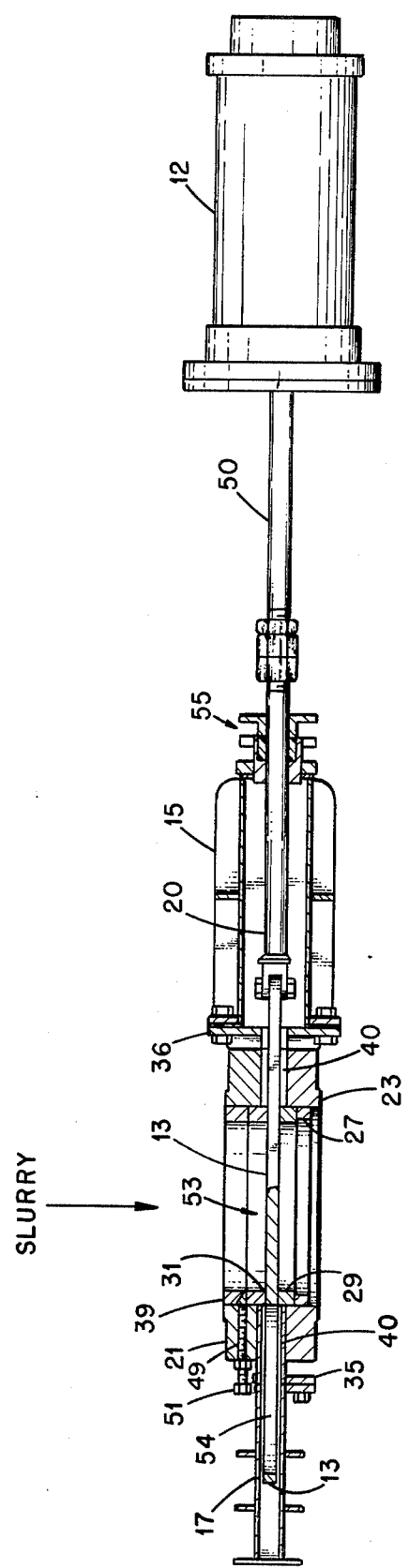

4,174,728

SLIDING-GATE VALVE

FIELD OF THE INVENTION

This invention was made in the course of, or under, a contract with the United States Department of Energy.

The invention relates generally to valves of the sliding-gate type, and more particularly to an improved form of such valves which is especially well suited for controlling the flow of highly abrasive materials.

Conventional sliding-gate valves are not entirely satisfactory for controlling the flow of highly abrasive materials—as, for example, a coal-ash/anthracene-oil slurry. When conventional valves are so used over extended periods, their sealing surfaces are subject to appreciable wear and galling.

OBJECTS OF THE INVENTION

Accordingly, it is an object of this invention to provide a sliding-gate valve of novel design.

It is another object to provide a sliding-gate valve for use with slurries, the valve being designed to minimize the deposition of solids on its sealing surfaces.

It is another object to provide a sliding-gate valve in which the sealing surfaces of the gate are shielded by the valve seats when the gate is in the fully open and fully closed positions.

It is another object to provide a sliding-gate valve in which the gate-to-seat clearance is purged with gas while the gate is in transit between the open and closed positions.

It is another object to provide a sliding-gate valve not requiring a stuffing box for the gate.

SUMMARY OF THE INVENTION

The invention may be summarized as follows: A valve assembly comprising: a valve body defining a circular bore extending about a first axis and also defining opposed passages intersection said bore and extending along a second axis substantially normal to the first; an annular seat assembly coaxially fitted in said bore and defining a flow channel, said assembly comprising rings disposed along the first axis, said rings including first and second seat rings cooperatively defining an annular gap communicating with said passages to form a guideway extending along the second axis, the first seat ring being slidably and sealably engaged with said body, the second seat ring being supported by said body in an axially fixed position; and a third ring disposed outwardly of and bearing on the first seat ring, the third ring being affixed to said body;

a valve casing supporting said body and including chambers extending in opposite directions from said body along the second axis, said chambers communicating respectively with said passages and being sealed from atmosphere;

a plate-type gate mounted for reciprocation in said guideway between a positions where a portion of said gate closes said channel and where a generally circular aperture in said gate is in register with said channel, and means respectively extending into said chambers for introducing therein purge gas at a pressure exceeding the pressure within said channel.

BRIEF DESCRIPTION OF THE DRAWINGS

FIG. 2 is a plan view of the valve, FIG. 3 is a longitudinal sectional view taken along line 3—3 of FIG. 2, FIG. 5 is a plan view of a valve gate designated as 13 in FIG. 3, and FIG. 6 is an end view of the same.

DESCRIPTION OF THE PREFERRED EMBODIMENT

Figure 1:
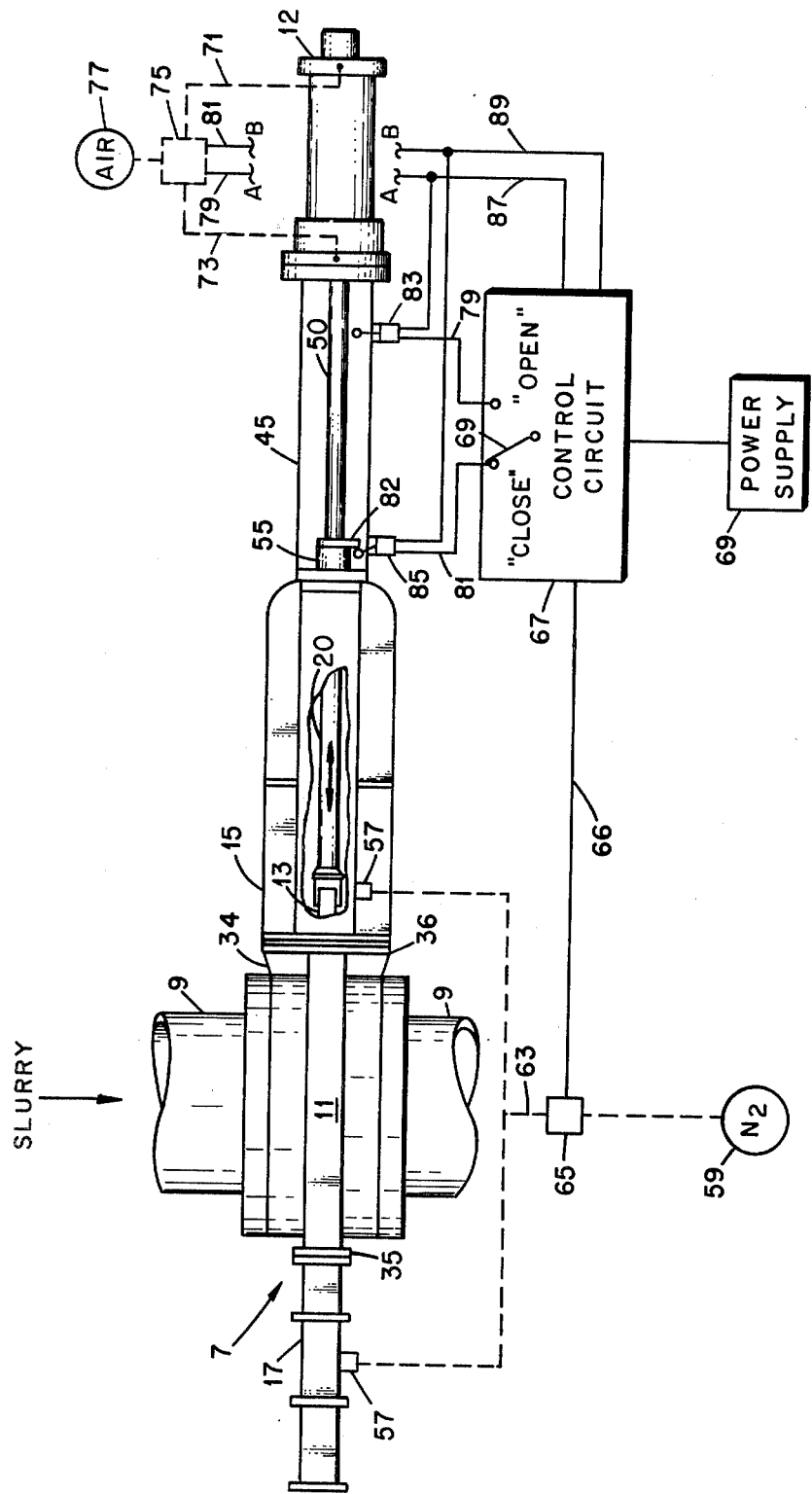
FIG. 1 is a schematic diagram of a valve designed in accordance with this invention and connected in a line for conveying slurry, arrangements for operating and purging the valve also being shown.

Referring to FIG. 1, the invention will be illustrated as embodied in a horizontally extending valve assembly 7, having a slidable gate 13 for controlling the flow of a highly abrasive slurry through a vertically disposed line 9. As will be described, means are provided for (1) moving the valve gate between fully open and fully closed positions, and (2) gas-buffering, or purging, the gate-to-valve-seat clearance during the times that the gate is in transit.

Briefly, the valve assembly includes a valve body 11 which is mounted between opposed, elongated chambers 15 and 17, these chambers being sealed from atmosphere. As shown, the upper and lower faces of the valve body are respectively connected to upper and lower sections of the slurry-conveying line 9. As will be described, an annular seat assembly is nested within the valve body 11 and defines a circular channel which is in register with the line 9. The valve gate 13 is mounted to extend transversely through the valve body 11. An end of the gate is disposed in the chamber 15 and is coupled, via a shaft 20, to an external pneumatic actuator 12 for moving the gate along the axis of the valve assembly. In the valve-closed state, the gate 13 is in a position where an imperforate portion thereof blocks the valve channel and where an apertured portion thereof extends into the chamber 17. In the valve-open state, the gate is in a position where its aperture is in register with the channel and where its imperforate portion extends into the chamber 15. The chambers 15 and 17 are in communication with the gate-to-seat clearance. When the gate is in motion, purge gas is admitted to the chambers and flows inward through this clearance to oppose the buildup of process solids therein.

Figure 4:
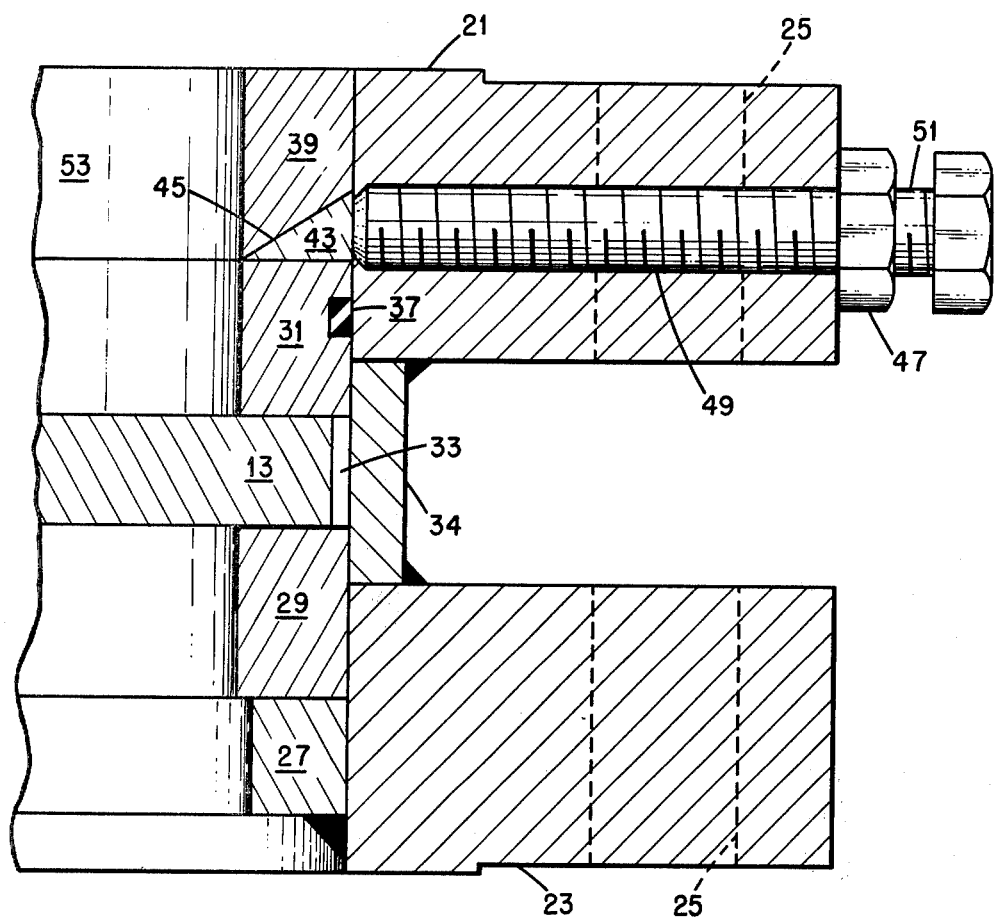
FIG. 4 is a cross sectional view taken along line 4—4 of FIG. 2.

Referring to FIGS. 2–4, the valve body 11 includes a housing 34 of rectangular cross section and provided with rectangular end flanges 35 and 36. These are sealably connected to flanges carried by the aforementioned chambers 15 and 17. Annular flanges 21 and 23 are welded to the top and bottom faces, respectively, of the housing 34, in alignment with a central aperture in the housing. Tapped holes 25 are provided in the annular flanges so that they may be sealably joined to flanges carried by the top and bottom sections of the slurry line 9.

A ring 27 (FIGS. 3 and 4) is fitted in and welded to the bottom annular flange 23 to provide support for a lower seat ring 29. A gasket may be provided between the ring and the seat. The seat ring 29 is press-fitted in the bottom flange and extends somewhat above the upper face thereof. An upper seat ring 31 is fitted within the top flange 21 and extends somewhat therebelow, defining an annular gap 33 with the lower seat ring 29. As shown (FIG. 4), the outer edge of the upper seat ring is formed with a circumferential groove for receiving any suitable packing ring 37. The packing ring is compressed between the seat 31 and flange 21, providing a seal there between while permitting the seat 31 to be adjusted downwardly, as will be described. The gap 33 defined by the seat rings, together with the opposed passages defined by the annular flanges 21 and 23, provides a horizontal guideway 40 (FIG. 3) for reception of the gate 13, as will be described.

As indicated, a hold-down ring 39 for the upper seat 31 is positioned on the latter and attached by screws to the inside edge of the top flange 21. The bottom face of the hold-down ring is cut away at equally spaced points so that the confronting surfaces of the ring and upper seat define openings in which wedgeshaped inserts 43 are slidably fitted as shown, each insert having its oblique face 45 in contact with a mating surface of the hold-down ring. The top flange 21 is formed with threaded radial bores 49 for receiving externally accessible screws 51, each of which bears on an external flat face of an insert 43. Jam nuts 47 are provided for locking the screws in a desired position. The above-described annular seat assembly defines a flow channel 53.

As shown (FIGS. 3, 5, 6), the valve gate 13 is an elongated, generally rectangular plate which is disposed in the guideway 40 and which extends into the aforementioned chambers 15 and 17. The end of the gate extending within the chamber 15 is coupled to the shaft 20, whose outer end extends through a conventional shaft seal assembly 55 carried by the chamber. As shown, the outer end of the shaft is coupled to the shaft 50 of the pneumatic cylinder 12. The cylinder is mounted to an extension 45 of the valve casing. The other end of the gate is formed with a circular aperture 54 having an inside diameter approximating that of the seat assembly. The cylinder 12 moves the gate between (1) a position where its aperture 54 is disposed within the chamber 17 and its imperforate portion closes the entire channel 53, and (2) a position where its aperture is in register with the channel. Referring to the valve as illustrated in FIG. 3, the lower face of the gate 13 is at all times in contact with the lower seat 29, whereas at all times a small clearance obtains between the upper seat 31 and the upper face of the gate. When desired, the operating clearance between the upper seat 31 and the gate may be reduced by advancing the screws 51 to move the inserts 43 inward, thus displacing the seat downwardly toward the gate.

Referring again to FIG. 1, conventional means are provided for automatically opening and closing the valve on command and for purging the gate-to-seat clearances while the valve is opening and closing. As shown, the chambers 15 and 17 are provided with standard nipples 57 or equivalent means for admitting any suitable purge gas, such as nitrogen, to the chambers. The nitrogen is at a pressure exceeding the pressure in the slurry system and is derived from an external source 59, the nipples being connected to the source through a line 63 containing a solenoid valve 65. An electrical lead 66 connects the solenoid valve to a conventional control circuit 67, having a power supply 69.

As shown, the end inlets of the pneumatic cylinder 12 are respectively connected through lines 71 and 73 to a solenoid valve 75. The valve directs air from a supply 77 into line 71 or line 73, depending on which of two electrical leads 79 and 81 is energized by the circuit 67. The leads 79 and 81 contain normally closed limit switches 83 and 85, respectively, for sensing when the gate 13 has reached its limits of travel. In the embodiment shown, the limit switches are mounted to the valve casing. As the gate moves into its closed position, a finger 82 carried by the gate shaft assembly opens switch 85; similarly, as the gate moves into its open position, the finger opens switch 83. A feedback lead 87 is connected between the control circuit and the section of lead 79 extending between the limit switch 83 and the solenoid valve 75. A feedback lead 89 is similarly connected between the control circuit and lead 81.

With the slurry valve in the closed position (FIGS. 1 and 3), the operator opens the valve by throwing a control-circuit switch 69 to "Open" position. In response, the control circuit energizes lead 79 to open the gate valve, and also energizes lead 66 to effect purging of the gate-to-seat clearance. More specifically, the control circuit energizes the air solenoid 75 via lead 79 (limit switch 83 now being closed), with the result that the solenoid admits air to line 73, thus actuating the cylinder 12 to drive the gate 13 rightward to the valve-open position. Simultaneously, the circuit energizes lead 66 to open the nitrogen solenoid 65 and admit nitrogen to the chambers 15 and 17, from which the nitrogen flows inward through the gate-to-seat clearances. When the gate 13 reaches the fully open position, limit switch 83 is opened, de-energizing the air solenoid 75 and the feedback line 87. In response, the control circuit de-energizes line 66, closing the purge valve. Limit switch 85 now is in its normally closed position. Closing of the gate valve is effected in analogous fashion.

A gate valve of the kind just described provides significant advantages, particularly in applications where the valve is exposed to highly abrasive particulates. One advantage of the valve is that in the fully open and closed positions there is 100% seat contact (seat 29), minimizing buildup on the valve seat 29 of particles from the slurry. Minimizing such buildup is essential where the particles are abrasive, because the slide action of the gate imbeds the particles in the sealing surfaces, causing galling and early valve failure. Another advantage is that the valve design eliminates the usual rectangular stuffing box containing a relatively large volume of packing sized to accommodate the rectangular gate. Another advantage is that the gate-to-seat clearance is purged with gas during the periods when 100% contact is not achieved—i.e., when the gate is in transit. This further reduces deposition and buildup of abrasive particulates on the sealing surfaces and also opposes deposition of particulates in the valve cavities. Still another advantage is that the clearance between the upper seat and the gate may be adjusted conveniently while the valve is in service. The use of a press-fitted lower seat 29 in combination with a support ring therefor is preferred over the use of a lower seat which is welded or otherwise affixed to the valve body, because welding tends to distort the seat.

A valve assembly designed essentially as shown in the figures was installed in a system for conveying a coal-ash/anthracene-oil slurry at an operating temperature in the range of 550°–600° F. The valve performed very satisfactorily for about five months, at which time the system was shut down for reasons having nothing to do with the performance of the valve. During this period the valve was actuated 1600 times; the typical transit time for the valve gate was about three seconds. The pressure differential across the gate when closed was about 200 psig. The slurry flow rate through the valve typically was in the range of from 200 to 250 lb./min.

After shutdown of the system, the sealing surfaces of the valve were inspected and found to be in excellent condition. There was no evidence of galling. This was in marked contrast to the performance of a conventional sliding-gate valve which had been tested in the same system and found unsuitable for extended use because of galling caused by slurry particles and because of excessive leakage resulting from solids building up between the gate and body, preventing full seat contact. The sealing surfaces of the conventional valve were not purged.

The gate for the experimental valve just referred to was a plate having a length of 28", a width of 10¾", and a thickness of ¾". The gate aperture (54, FIG. 5) had a diameter of 9½", the center of the aperture being 5½" inward from the nearer end of the gate. The gate was composed of 1020 carbon steel provided with a coating of electroplated chrome. The four rings comprising the seat assembly had an inside diameter of approximately 9½" and an outside diameter of approximately 11". The two seat rings 29, 31 were composed of "Jalloy 360" (armor plate); the seating faces of the rings were lapped flat. The hold-down ring and the seat-support ring were composed of 4140 carbon steel. The as-installed clearance between the upper seat and the gate was 0.001". The packing ring (37, FIG. 4) was composed of asbestos fiber, as was the gasket (28, FIG. 4). The annular flanges 21, 23 had an outside diameter of 17½". The gate-to-seat clearance was purged with gaseous nitrogen at a pressure of about 50 psig. The typical nitrogen flow rate to the valve was about 31.5 scfm. The casing portions 15, 17 and the valve-body portion 34 (FIG. 3) were composed of 1020 carbon steel, the casing flanges being carbon steel, grade A106.

The foregoing description is provided for the purpose of illustration, not limitation, and it will be apparent to those versed in the art that various modifications may be made in the illustrative embodiment within the scope of the appended claims. If desired, the lower seat ring 29 may be affixed to the lower flange 23, as by welding, and the support ring 27 eliminated. If the lower seat is welded, subsequent machining or lapping of its seating surface may be advisable. In another modification, each of the seat rings 29 and 31 may be provided with a circumferential groove for receiving a packing ring, thus eliminating the need for the gasket 28.

For brevity, the valve has been illustrated as utilized with a particular slurry, but it will be apparent that it may be used with liquids and slurries in general. The valve has been illustrated in terms of a horizontal orientation, but it may be employed in various other orientations. Accordingly, the rings comprising the seat assembly shown in FIG. 4 may be designated more generally as a first seat ring (the upper seat 31); a second seat ring (the lower seat 29); a third ring (the hold-down ring 39); and a fourth ring (the support ring 27).

What is claimed is:

1. A valve assembly comprising:
a valve body defining a circular bore extending about a first axis and also defining opposed passages intersecting said bore and extending along a second axis substantially normal to the first;
an annular seat assembly coaxially fitted in said bore and defining a flow channel, said assembly comprising rings disposed along the first axis, said rings including first and second seat rings cooperatively defining an annular gap communicating with said passages to form a guideway extending along the second axis, the first seat ring being slidably and sealably engaged with said body, the second seat ring being supported by said body in an axially fixed position; and a third ring disposed outwardly of and bearing on the first seat ring, the third ring being fixed to said body against axial movement therein;
a valve casing supporting said body and including chambers extending in opposite directions from said body along the second axis, said chambers communicating respectively with said passages and being sealed from atmosphere;
a plate-type gate mounted for reciprocation in said guideway between positions where a portion of said gate closes said channel and where a generally circular aperture in said gate is in register with said channel, the third ring being cut away to receive slidable inserts for advancement toward said channel to displace the first seat ring toward said gate; and means respectively extending into said chambers for introducing therein purge gas at a pressure exceeding the pressure within said channel.

2. The assembly of claim 1 wherein a packing ring is compressibly mounted in the interface between the first ring and said body.

3. The assembly of claim 1 wherein an end of said gate is coupled to a shaft extending along the axis of one of said sealed chambers.

4. The assembly of claim 3 wherein the other end of said shaft extends outwardly of said one of said chambers through a seal for said shaft.

5. In a valve assembly, the combination of:
a valve body defining a circular bore extending about a first axis,
a seat assembly coaxially fitted in said bore and defining a flow channel, said seat assembly comprising first and second seat rings cooperatively defining an annular gap which together with opposed passages in said body forms a guideway extending along a second axis normal to the first axis, the first seat ring being slidably and sealably engaged with said body, the second seat ring being press-fitted in but not affixed to said body; a third ring disposed outwardly of and bearing on the first seat ring, the third ring being cut away at spaced-apart locations to receive inwardly slidable wedge-shaped inserts for displacing the first seat ring toward the second seat ring when said inserts are forced inward toward said channel; and a fourth ring affixed to said body for preventing displacement of the second seat ring in a direction away from the first seat ring.

6. A valve assembly comprising:
a valve body defining a circular bore extending about a first axis and also defining opposed passages intersecting said bore and extending along a second axis substantially normal to the first;
an annular seat assembly coaxially fitted in said bore and defining a flow channel, said assembly comprising rings disposed along the first axis, said rings including first and second seat rings cooperatively defining an annular gap communicating with said passages to form a guideway extending along the second axis, the first seat ring being slidably and sealably engaged with said body; the second seat ring being tightly fitted in but not affixed to said body; a third ring disposed outwardly of and bearing on the first seat ring, the third ring being affixed to said body; a fourth ring affixed to said body for preventing displacement of the second seat ring in a direction away from the first seat ring; and inwardly slidable wedge-shaped inserts positioned between the first seat ring and the second seat ring for displacing the first seat ring toward the second seat ring;

a valve casing supporting said body and including chambers extending in opposite directions from said body along the second axis, said chambers communicating respectively with said passages and being sealed from atmosphere;

a plate-type gate mounted for reciprocation in said guideway between positions where a portion of said gate closes said channel and where a generally circular aperture in said gate is in register with said channel, and means respectively extending into said chambers for introducing therein purge gas at a pressure exceeding the pressure within said channel.

* * * * *